(12) United States Patent
Gotz et al.

(10) Patent No.: US 9,171,104 B2
(45) Date of Patent: *Oct. 27, 2015

(54) ITERATIVE REFINEMENT OF COHORTS USING VISUAL EXPLORATION AND DATA ANALYTICS

(71) Applicant: International Business Machines Corporation, Armonk, NY (US)

(72) Inventors: David Gotz, Purdys, NY (US); Adam Perer, Long Island City, NY (US); Zhiyuan Zhang, Elmhurst, NY (US)

(73) Assignee: International Business Machines Corporation, Armonk, NY (US)

( * ) Notice: Subject to any disclaimer, the term of this patent is extended or adjusted under 35 U.S.C. 154(b) by 438 days.

This patent is subject to a terminal disclaimer.

(21) Appl. No.: 13/672,000

(22) Filed: Nov. 8, 2012

(65) Prior Publication Data

US 2014/0108380 A1   Apr. 17, 2014

Related U.S. Application Data

(63) Continuation of application No. 13/650,786, filed on Oct. 12, 2012.

(51) Int. Cl.
*G06F 17/30* (2006.01)

(52) U.S. Cl.
CPC .... *G06F 17/30991* (2013.01); *G06F 17/30994* (2013.01)

(58) Field of Classification Search
CPC .................. G06F 17/30991; G06F 17/30994

USPC .......................................................... 707/722
See application file for complete search history.

(56) References Cited

U.S. PATENT DOCUMENTS

| | | | |
|---|---|---|---|
| 7,930,262 B2 * | 4/2011 | Friedlander et al. ............ | 706/45 |
| 8,145,582 B2 * | 3/2012 | Angell et al. ................... | 706/45 |
| 2010/0131502 A1 * | 5/2010 | Fordham ........................ | 707/736 |
| 2011/0112853 A1 * | 5/2011 | Tong et al. ........................ | 705/2 |
| 2012/0131484 A1 * | 5/2012 | Neumann et al. ............. | 715/769 |
| 2012/0203708 A1 * | 8/2012 | Psota et al. ..................... | 705/347 |
| 2013/0006916 A1 * | 1/2013 | McBride et al. ................ | 706/52 |
| 2013/0117368 A1 * | 5/2013 | Dozier et al. ................... | 709/204 |
| 2013/0185096 A1 * | 7/2013 | Giusti et al. ...................... | 705/3 |

OTHER PUBLICATIONS

Bavoil et al., "VisTrails: Enabling Interactive Multiple-View Visualizations", IEEE Visualization, (2005).

(Continued)

*Primary Examiner* — Rehana Perveen
*Assistant Examiner* — Tiffany Thuy Bui
(74) *Attorney, Agent, or Firm* — Ryan, Mason & Lewis, LLP (57) ABSTRACT

Methods and apparatus are provided for iterative refinement of cohorts using visual exploration and data analytics. A cohort comprised of multiple data objects is defined by obtaining an initial cohort seeding; visualizing the initial cohort using a selected view to present a current cohort; reducing the current cohort using one or more visual filters; visualizing the current cohort using a selected view; expanding the current cohort using one or more selected analytics; and determining whether the current cohort should be further modified using one or more of additional reductions and additional expansions. Cohorts can be passed between views and analytics via drag-and-drop interactions as an analysis unfolds.

10 Claims, 6 Drawing Sheets

(56) References Cited

OTHER PUBLICATIONS

Lins et al., "VicCareTrails: Visualizing Trails in the Eelctronic Health Record with Timed Word Trees, a Pancreas Cancer Use Case", IEEE VisWeek Workshop on Visual Analytics Health Care (2011).
Daniel A. Keim, "Information Visualization and Visual Data Mining", IEEE Transactions on Visualization and Computer Graphics (2002).
Murphy et al., "A Visual Interface Designed for Novice Users to find Research Patient Cohorts in a Large Biomedical Database", AMIA (2003).
Wongsuphasawat et al., "Finding Comprable Temporal Categorical Records: A Similarity Measure with an Interactive Visualization", IEEE VAST (2009).
Hu et al., "A Healthcare Utilization Analysis Framework for Hot Spotting and Contextual Anomaly Detection", AMIA (2012).
M. Porta (editor), "A Dictionary of Epidemiology, 5th Ed", Oxford University Press (2008).
B. Shneiderman, "Tree Visualization with Tree-Maps 2-d Space-filing Approach", ACM Transactions on Graphics, II(1), pp. 92-99 (1992).
Wongsuphasawat et al., "Explorinig Flow, Factors, and Outcomes of Temporal Event Sequences with the Outflow Visualization", IEEE information Visualization (2012).
U.S. Appl. No. 12/976,685: "Data Visualization for Time-Based Cohorts".
U.S. Appl. No. 11/831,103: "Analytical Reporting and Data Mart Architecture for Public Organizations".
U.S. Appl. No. 12/890,018 "Systems and Methods for Real-Time Data Ingestion to a Clinical Analytics Platform".

* cited by examiner

ITERATIVE REFINEMENT OF COHORTS USING VISUAL EXPLORATION AND DATA ANALYTICS

CROSS-REFERENCE TO RELATED APPLICATIONS

This application is a continuation of U.S. patent application Ser. No. 13/650,786, filed Oct. 12, 2012, incorporated by reference herein.

FIELD OF THE INVENTION

The present invention relates generally to the electrical, electronic and computer arts, and, more particularly, to techniques for generating and refining cohorts of similar objects, such as data records for individuals or entities.

BACKGROUND OF THE INVENTION

Retrospective cohort analysis is a widely used technique in many fields. In the medical field, for example, electronic medical records (EMRs) contain a large amount of medical information for patients. It is often desirable to group similar patients as a cohort. Patient cohorts are groups of patients and their associated information, such as gender, age, diagnoses, and treatments. Retrospective patient cohort analysis is the analysis of medical and diagnostic histories of similar patients to make healthcare discoveries.

In the traditional pipeline, analysts work manually to define specific cohort constraints (e.g., "female patients over age 70") or apply specialized batch analytics to computationally determine a meaningful group of patients (e.g., high-utilization cohorts). Unfortunately, both methods have limitations. For the definition of the cohort constraints, it is difficult to select the attributes that are to be queried from a list of hundreds or thousands of patient attributes. For batch analytics that behave like a "black box," users have few ways to apply their domain expertise to influence the process.

A need exists for an integrated system that combines visual exploration and data analytics to interactively visualize and refine cohorts, request analytics on those cohorts, and make new discoveries.

SUMMARY OF THE INVENTION

Generally, methods and apparatus are provided for iterative refinement of cohorts using visual exploration and data analytics. According to one aspect of the invention, a cohort comprised of multiple data objects is defined by obtaining an initial cohort seeding; visualizing the initial cohort using a selected view to present a current cohort; reducing the current cohort using one or more visual filters; visualizing the current cohort using a selected view; expanding the current cohort using one or more selected analytics; and determining whether the current cohort should be further modified using one or more of additional reductions and additional expansions.

The current cohort can be visualized with a selected view by dragging and dropping the current cohort onto a visual representation for the selected view. A visualization-driven query can be performed to gather data required for the selected view.

A cohort can be reduced by interacting with a selected visualization to reduce a number of the data objects in the current cohort. For example, the interaction can further comprise a direct visual selection of graphical elements that represent subsets of the current cohort and applying filters based on the visual selection.

A cohort can be expanded by dragging and dropping the current cohort onto a visual representation for a given analysis to initiate the step of expanding the current cohort using one or more selected analytics. Additional input parameters are optionally collected from a user as part of the expansion. The current cohort can be expanded by modifying the current cohort to produce a larger cohort by expanding one or more of the number of objects in the cohort and the number of properties for the objects in the cohort. The expanded current cohort can be visualized using the current selected view.

A more complete understanding of the present invention, as well as further features and advantages of the present invention, will be obtained by reference to the following detailed description and drawings.

DETAILED DESCRIPTION OF PREFERRED EMBODIMENTS

Aspects of the present invention provide a tool for generating and refining cohorts using visual exploration and data analytics to interactively visualize and refine cohorts. According to a further aspect of the invention, a user can request analytics on the generated cohorts and make new discoveries. While the present invention is illustrated in the context of patient cohorts, the present invention can be applied in any setting where cohorts are generated and refined, such as customer management, stock market analysis and security analysis for computer networks.

Among other benefits, the disclosed cohort definition system 600, as discussed further below in conjunction with FIG. 6, allows patient cohorts to be interactively defined and modified at any step of an analysis. In addition, cohorts can be visualized in various ways and users can switch between different visualization metaphors. Analytics can also be applied to cohorts for on-demand processing at any time in an analysis.

The user interface of the cohort definition system 600 supports these tasks by allowing direct manipulation of three key artifacts: (1) cohorts, (2) views, and (3) analytics. Generally, cohorts represent sets of patients and their associated information. Views are visualization components used to graphically represent and interactively refine the cohorts. Analytics operate on cohorts and are used to generate new cohorts, produce additional data for a specific cohort, or to otherwise modify (e.g., expand or segment) an existing cohort.

Cohorts

Patient cohorts are groups of patients and their associated information, such as gender, age, diagnoses, and treatments.

A cohort serves as the underlying data structure that is used to pass data throughout the system's pipeline. Patient cohorts are the objects on which the other two artifacts—analytics and views operate. Included within each patient cohort representation is a list of individual patient identification numbers that can optionally be used to connect cohort members with more detailed clinical data located in a remote data store.

In various exemplary embodiments described herein, patient cohorts are passed between views and analytics via drag-and-drop interactions as an analysis unfolds. Cohorts can also be persisted for future reference.

Analytics

Analytics are computational components that operate on cohorts in various ways. The exemplary cohort definition system 600 supports two main types of analytics: (1) batch analytics and (2) on-demand analytics. Batch analytics are components that are executed automatically in the background by the exemplary cohort definition system 600 (e.g., nightly as new patient data is imported to the system). Batch analytics process an entire patient population and identify groups of interest. For example, a batch analytic may be used to perform risk stratification, generating lists of patients that have common sets of risk factors. The batch analytics components generate new cohorts that can serve as starting points for exploratory analysis.

On-demand analytics, in contrast, are performed in an ad-hoc fashion at the specific request of a user. On-demand analytics take as input a specific patient cohort, plus an optional set of input parameters. In response, an on-demand analytics tool can produce additional information about patients in the cohort (e.g., calculate risk scores) and/or refine the membership of the cohort (e.g., query for additional similar patients).

Views

Views are visualization components that offer specific targeted ways to graphically depict and interact with a patient cohort. Each view is designed to take a single cohort as input and render a specific subset of patient features. Views also provide interactive capabilities through which users can selectively brush and filter to explore and refine the set of patients in the cohort.

For example, the exemplary cohort definition system 600 includes a patient cohort summary view that depicts general information about a group of patients such as age and gender distributions along with a Treemap summarizing diagnosis code statistics. See, for example, B. Shneiderman, "Tree Visualization with Tree-Maps: 2-D Space-filling Approach," ACM Transactions on Graphics, 11(1), 92-99 (1992), incorporated by reference herein.

The exemplary patient cohort summary view provides multiple coordinated visualizations through which users can refine the set of patients in a cohort (e.g., "filter to only male patients over age 50 with specific classes of cancer"). The exemplary cohort definition system 600 also provides a generic table view to look at a detailed list of patients in a cohort including individual patient identification numbers.

Beyond these generic views, additional components can be provided for use-case specific visualizations. For example, another view provided by an exemplary cohort definition system 600 is an Outflow visualization for exploring patient symptom evolution. See, e.g., K. Wongsuphasawat and D. Gotz, "Exploring Flow, Factors, and Outcomes of Temporal Event Sequences with the Outflow Visualization," IEEE Information Visualization (2012), incorporated by reference herein.

Each supported view option has the additional ability to export the set of patients being visualized at any given point in time. Therefore, from a data perspective, views are similar to on-demand analytics in that they both take a cohort as input and produce a cohort as output.

Figure 1:
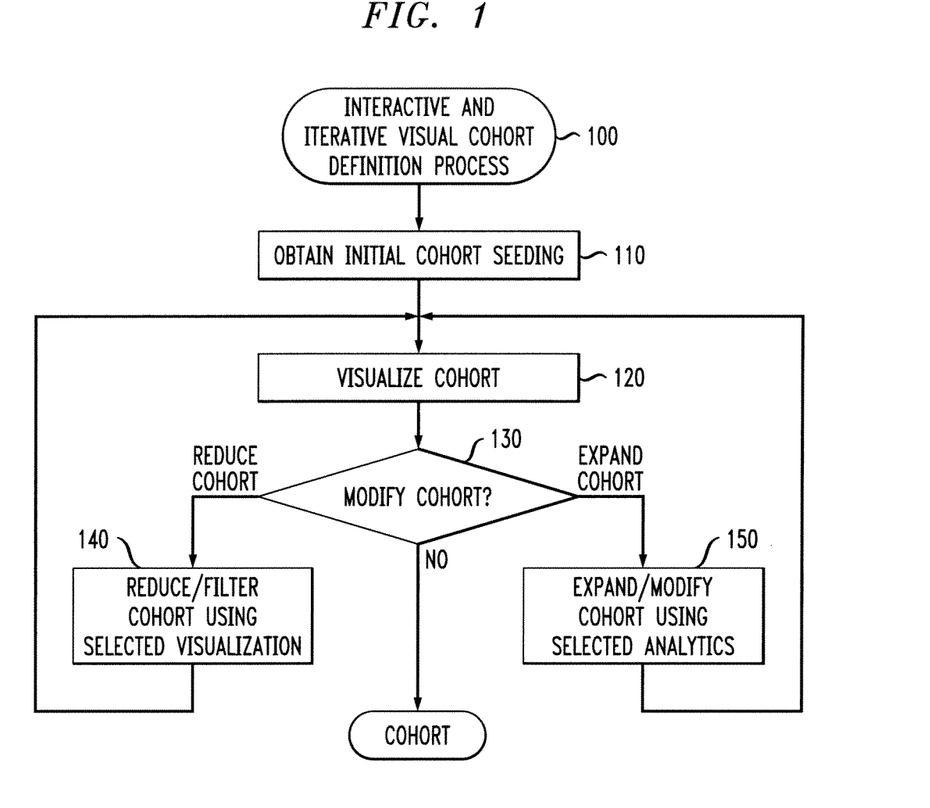
FIG. 1 is a flow chart describing an exemplary implementation of an interactive and iterative visual cohort definition process incorporating aspects of the present invention.

FIG. 1 is a flow chart describing an exemplary implementation of an interactive and iterative visual cohort definition process 100 incorporating aspects of the present invention. As shown in FIG. 1, the exemplary interactive and iterative visual cohort definition process 100 initially obtains an initial cohort seeding during step 110. As discussed further below in conjunction with FIG. 3, the initial cohort can be generated, for example, based on a user query, system analytics or selected from a previously saved cohort.

During step 120, the user visualizes the current cohort using a selected view. A test is performed during step 130 to determine if the cohort should be modified. The determination can be based on a statistical measure or intuition of the user. In this manner, the cohorts are statistically valid (e.g., balanced) to enable subsequent analysis. If it is determined during step 130 that the cohort should not be modified, then program control terminates.

If, however, it is determined during step 130 that the cohort should be modified by reduction, then program control proceeds to step 140 where the user can reduce or visually filter the cohort using a selected visualization. For example, a user can reduce a patient cohort by excluding all men below an age of 50. Thereafter, the modified cohort is again visualized during step 120 and a new determination is made during step 140 as to whether the current cohort should be modified.

If, however, it is determined during step 130 that the cohort should be modified by expansion, then program control proceeds to step 150 where the user can expand or modify the current cohort using selected analytics. During an expansion using analysis, the system can modify the current cohort to expand its size even if this results in a relaxation of the user supplied constraints applied during the reduction step. This can be used, for example, to produce a larger cohort that can provide statistically significant insights about the cohort. For instance, if the above exemplary reduction of a patient cohort by excluding all men below an age of 50 resulted in a cohort that was too small for a given use case, the user could request analytics that additional patients be retrieved that don't fully match the age constraint of 50 years if they are similar enough in other aspects, thereby expanding the cohort.

Figure 2:
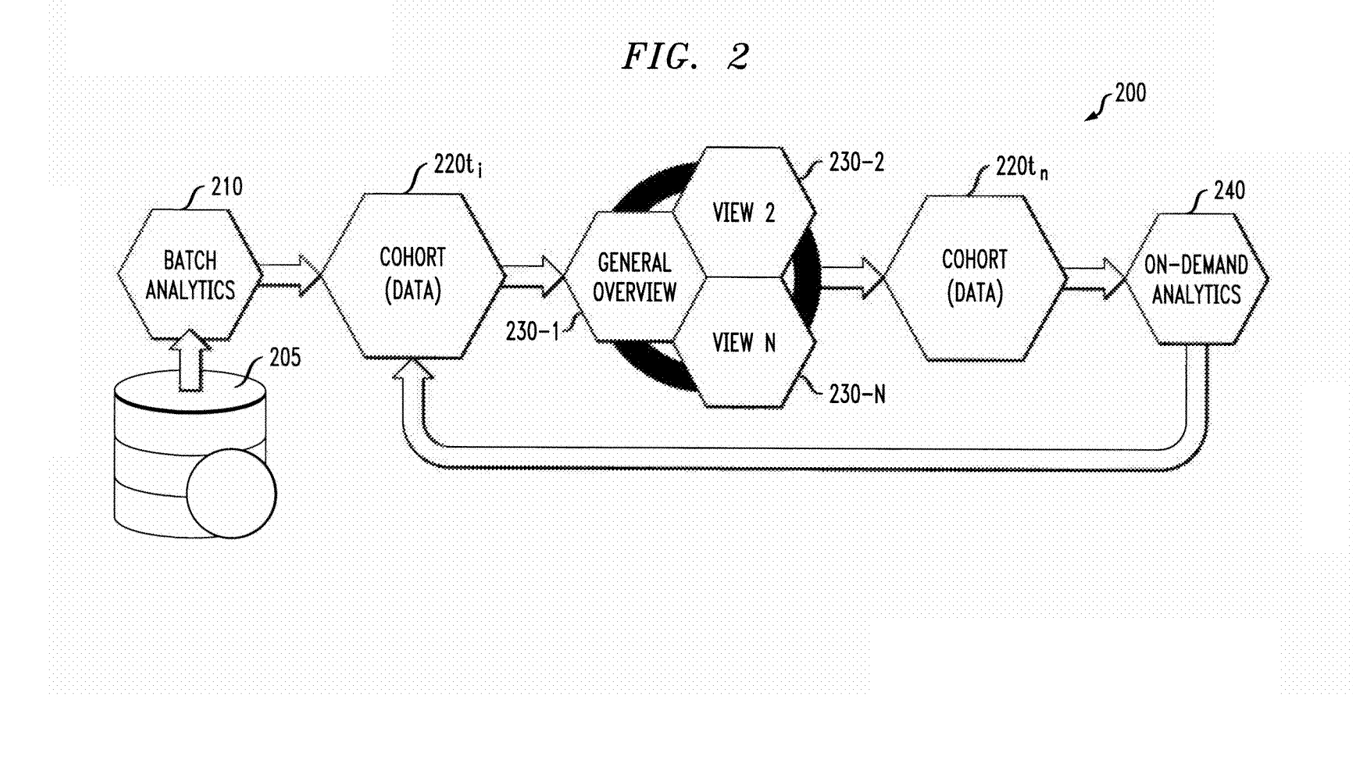
FIGS. 2 and 3 illustrate exemplary implementations of the interactive and iterative visual cohort definition process of FIG. 1 in further detail.

FIG. 2 illustrates an exemplary implementation 200 of the interactive and iterative visual cohort definition process 100 of FIG. 1 in further detail. As previously indicated, aspects of the present invention provide an iterative analytical workflow that allows an iterative refinement and expansion of a cohort. In one exemplary embodiment, a user employs drag-and-drop interaction with three types of artifacts: cohorts, views and analytics.

The similarity in data flows for both on-demand analytics and views are an important aspect of the exemplary cohort definition system 600. This commonality allows users to chain together views and analytics—both serving as operators on cohorts—into arbitrary sequences. Users can interactively perform complex and ad hoc exploratory analysis processes that mix visual interactions and filtering with computational analysis routines. Users can interact with the exemplary cohort definition system 600 using drag-and-drop interactions that connect the three types of artifacts.

As indicated above and shown in FIG. 2, an initial cohort can be generated using batch analytics 210 on a database 205 comprising similar objects. Thereafter, users can drag a selected cohort $220t_i$ to one or more available views 230-1 through 230-N to visualize the cohort $220t_i$. Users can select a cohort $220t_i$ from either the current view or from a list of saved cohorts in a sidebar, as discussed further below in conjunction with FIGS. 4 and 5. The sidebar optionally contains both system generated cohorts 220 (via batch analytics 210) and those that have been manually defined (via prior user interaction).

For example, an exemplary set of available views 230 can comprise a general overview 230-1, a congestive heart failure (CHF) risk view 230-2 and a general table view 230-N. Generally, the general overview 230-1 provides a visual summary of high-level demographic data such as age and gender distributions, as well as information about the prevalence of various diagnosis codes; the congestive heart failure (CHF) risk view 230-2 provides a visualization of disease evolution paths for a group of patients along with information about the corresponding outcomes for each path; and the general table view 230-N provides a detailed tabular listing of all patients in a cohort. The user can employ one or more views 230 to reduce and/or filter the current cohort 220 using a selected visualization 230 to generate a modified cohort $220t_n$.

In addition, users can drag cohorts 220 to analytics 240 to process them. The user can employ one or more analytics 240 to expand the current cohort 220 using a selected analytic 240 to generate a modified cohort $220t$.

Figure 3:
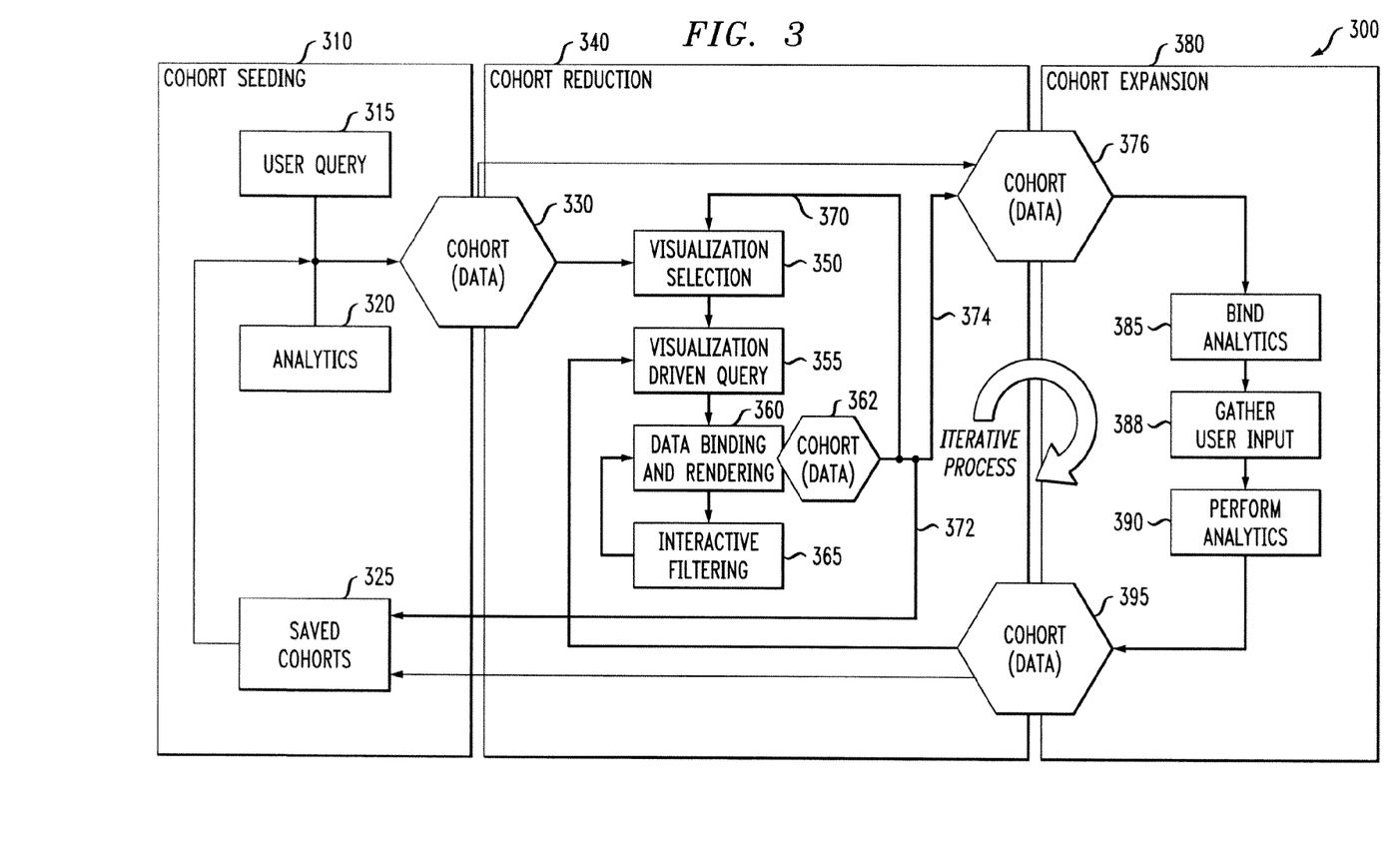

FIG. 3 illustrates an exemplary implementation 300 of the interactive and iterative visual cohort definition process 100 of FIG. 1 in further detail. As shown in FIG. 3, the interactive and iterative visual cohort definition process implementation 300 comprises three phases: cohort seeding 310, cohort reduction 340 and cohort expansion 380, in a similar manner to FIG. 1.

As indicated above, an initial cohort seeding 330 can be generated, for example, based on a user query 315, system analytics 320 (e.g., risk stratification) or selected from a previously saved cohort 325.

Thereafter, the user can drag-and-drop the initial cohort seeding 330 into a selected visualization during step 350. Driven by the data needs of the selected visualization, the system performs a query to gather the needed data about the cohort. The retrieved data is then bound to the visualization and rendered during step 360 to display the current cohort 362.

At this stage, the user can (i) perform interactive filtering on the current cohort 362 during step 365 to further modify the cohort; (ii) follow path 370 by dragging-and-dropping the current cohort 362 into a new visualization (step 350); (iii) follow path 372 to drag-and-drop the current cohort 362 to save the cohort into the cohort library 325; (iv) follow path 374 by dragging-and-dropping the current cohort 362 on to a selected analytic component which specifies the input cohort 376 for analytic processing.

The cohort 376 given as input to the selected analytic is bound to the analytic module during step 385. Optionally, step 388 gathers additional input from the user. The analytic then executes in step 390. For example, an exemplary similarity analytic can identify similar objects to the current objects in the cohort 376 using data mining techniques. In this exemplary analytic, step 388 is performed via a model dialog box which asks a users to specify an expansion factor (e.g., 20%) which is used by the analytic to determine how many similar patients to add to the cohort. In a further variation, an exemplary risk assessment analytic can calculate new risk scores for objects in the cohort 376 using predictive modeling techniques.

After the analytics are performed during step 390, the resultant modified cohort 395 is then visualized using the currently selected visualization, beginning with step 355. The process continues in the manner described above.

Figure 4:
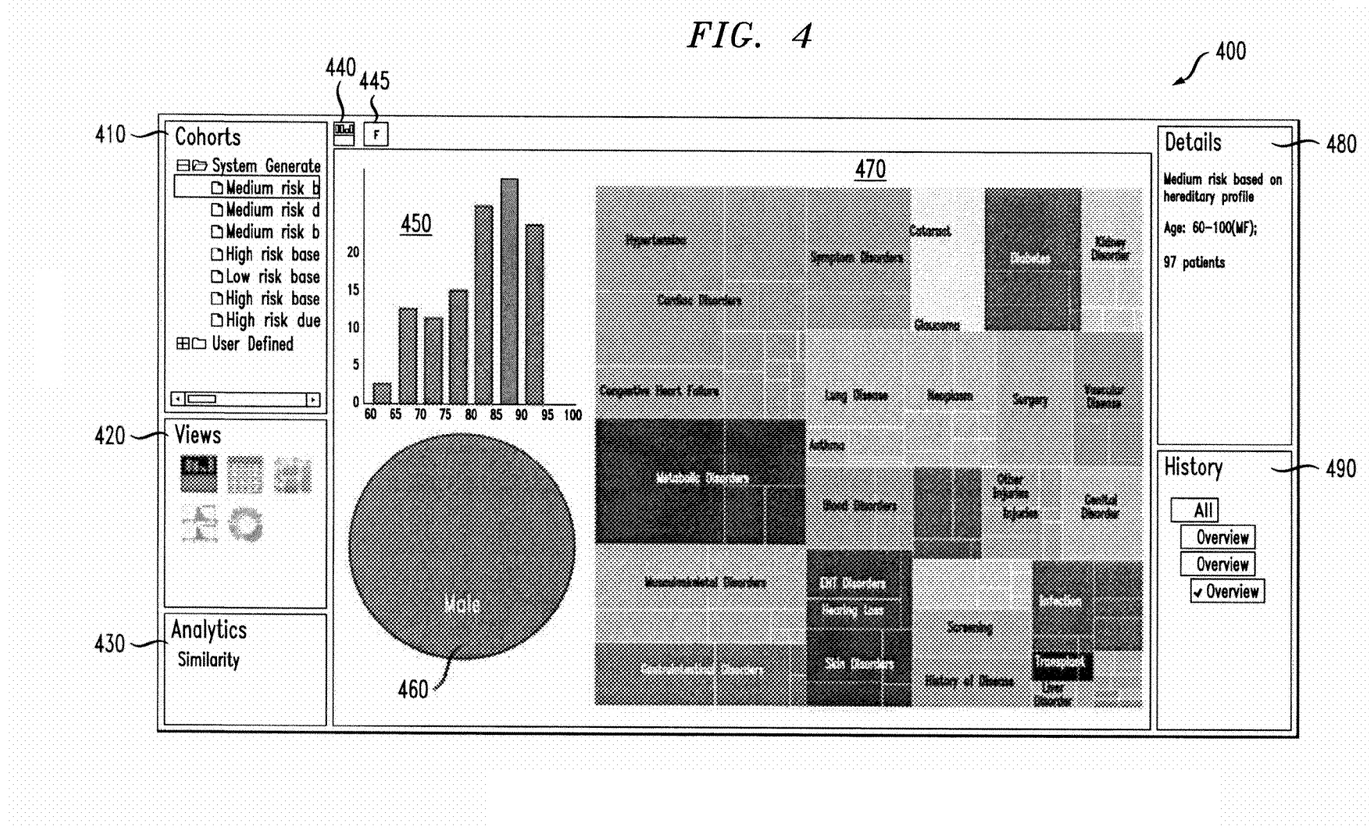
FIGS. 4 and 5 illustrate exemplary user interfaces for defining cohorts in accordance with aspects of the present invention.

FIG. 4 illustrates an exemplary user interface 400 for defining cohorts in accordance with aspects of the present invention. As previously indicated, a session may start with a user selecting a cohort from a sidebar 410 of the user interface 400, such as a group of patients flagged as being at risk of developing heart disease. The user can drag and drop the selected cohort from the sidebar 410 into a desired view in a view sidebar 420, such as a view icon for a cohort summary visualization. The user can interactively explore the aggregate information about the selected cohort and apply filters to modify the cohort for a specific analytic task.

For example, the exemplary user interface 400 of FIG. 4 illustrates a summary view after filtering the cohort to only male patients over the age of 60. Panel 450 is a bar chart illustrating the number of men in each age bracket above 60. Panel 460 is a pie chart illustrating the percentage of men in the cohort (100%). Panel 470 illustrates a hierarchical overview of the distribution of medical diagnosis codes that appear in the patients' medical records. Filtering is performed by selecting the desired graphical elements in the visualization (e.g., the bars in panel 450 for patients over the age of 60) and clicking the filter button 445.

The user can then optionally drag and drop the selected cohort from the active view 440 into one or more additional desired views in the view sidebar 420, as discussed further below in conjunction with FIG. 5. The iterative filtering process using multiple views of the data allows users to identify a cohort population of interest.

The resultant cohort created by the filtering step(s) can then be dragged-and-dropped into a desired analytic in an analytics sidebar 430, in order to expand the patient population and/or calculate additional data properties for the patients in the population. In this manner, the user can take advantage of on-demand analytics 430 to retrieve additional patients that are, for example, similar to those in the current cohort but that were left out of the initial cohort that was first used to start the investigation.

On-demand analytics are initiated when a user drags the cohort from the current view 440 (or a persisted cohort from the sidebar 410) to a selected analysis component in a sidebar 430. All available on-demand analytics are listed in the sidebar 430. After a cohort is dropped on a specific analytic component, the system immediately begins the analysis process. If additional input parameters are required by a given analytics, a dialog box is displayed to gather the needed user input. For example, a dialog box can be presented for a patient similarity analytic component to obtain an "expansion factor" that specifies how many similar patients to retrieve as the input cohort is expanded. For example, an expansion factor of 0.2 will grow the size of a cohort by 20%.

After the selected similarity analysis computation completes, an expanded cohort is returned and immediately visualized, for example, using the same view that was active prior to the analytics request.

Panel 480 is a details panel showing additional information about the overall cohort being visualized in the current view and the specific elements of the visualization, if any, that have been selected by the user.

A user's analytic history can be summarized in a sidebar 490, capturing the provenance of the currently viewed cohort and allowing a user to revisit prior stages of his/her investigation.

Figure 5:
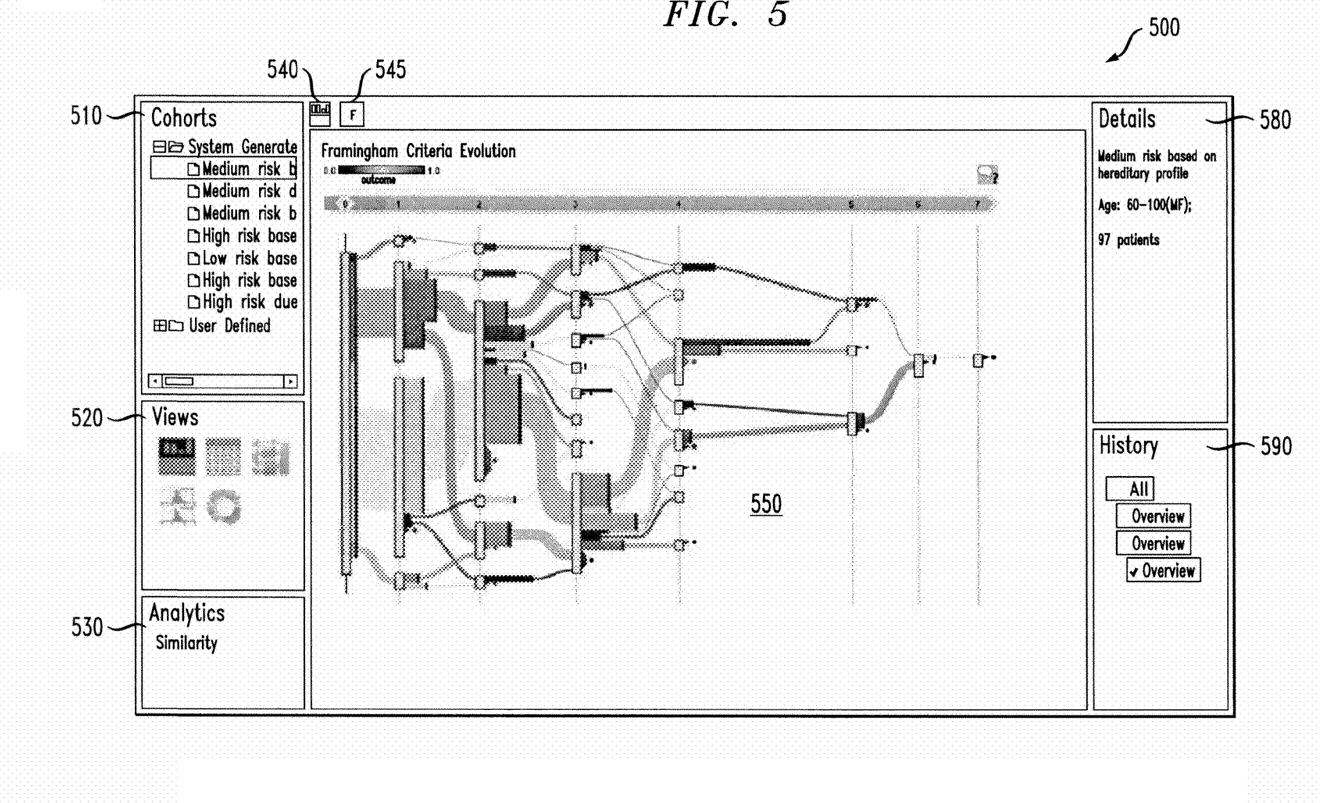

FIG. 5 illustrates an exemplary user interface 500 for defining cohorts in accordance with an alternate exemplary visualization aspect of the present invention. The exemplary user interface 500 comprises sidebars 510, 520, 530, 580, 590 and icons 540 and 545 that can be implemented in a similar manner to the sidebars 410, 420, 430, 480, 490 and icons 440, 445 of FIG. 4.

In FIG. 5, the user has dropped a selected cohort from the sidebar 510 into another desired view in the view sidebar 520, such as an Outflow view to visualize the variations in disease progression for the set of identified patients. A user can then select a specific pathway from the Outflow visualization and apply additional filters via button 545. For example, a user might select the largest pathway, which has mixed outcomes to perform further analysis. Once a reduced set of patients has been obtained via the application of visual filters as described above, analytics can be used to expand the cohort (by dragging icon 540 to an analytic in the sidebar 530) or an alternative view can be used to visualize different aspects of the cohort by dragging icon 540 to a view in sidebar 520. Finally, the cohort could be saved by dragging icon 540 to the cohort sidebar 510.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. FIG. 6 depicts an exemplary cohort definition system 600 that may be useful in implementing one or more aspects and/or elements of the present invention. With reference to FIG. 6, such an implementation might employ, for example, a processor 602, a memory 604, and an input/output interface formed, for example, by a display 606 and a keyboard 608. The memory 604 may store, for example, code for implementing the layout process 300 of FIG. 3.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Analog-to-digital converter(s) 620 may be provided to receive analog input, such as analog video feed, and to digitize same. Such converter(s) may be interconnected with system bus 610.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

Figure 6:
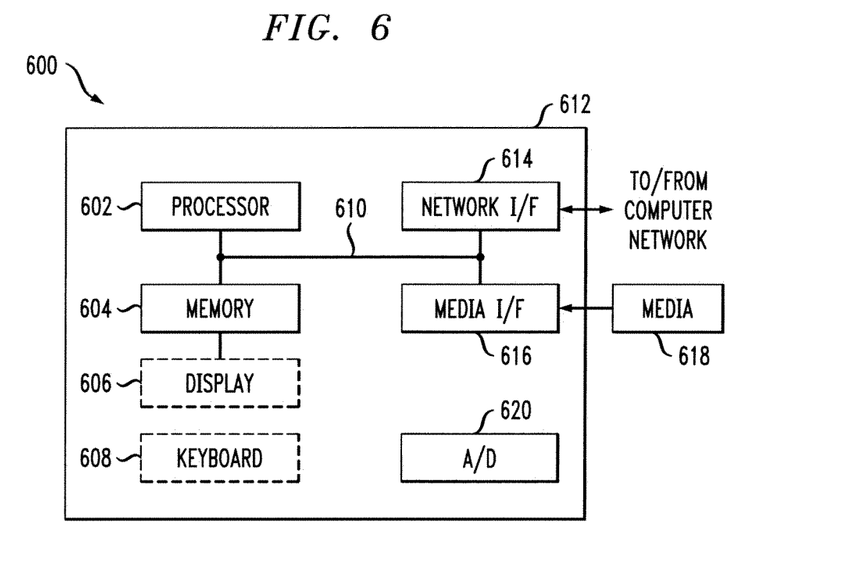
FIG. 6 depicts an exemplary cohort definition system that may be useful in implementing one or more aspects and/or elements of the present invention.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 602. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the similar forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus defining a cohort comprised of multiple data objects, the apparatus comprising:
    a memory; and
    at least one hardware device, coupled to the memory, operative to:
    obtain an initial cohort seeding;
    visualize said initial cohort using a selected view to present a current cohort;
    reduce said current cohort using one or more visual filters;
    visualize said current cohort using a selected view;
    expand said current cohort using one or more selected analytics using computational techniques to automatically identify additional objects for said current cohort based on one or more similarity input parameters obtained from a user, wherein said current cohort is expanded by a specified expansion factor to add additional objects to said current cohort that satisfy a similarity metric with respect to one or more existing objects in said current cohort, wherein said step of expanding said current cohort using one or more selected analytics further comprises the step of modifying said current cohort to produce a larger cohort by expanding one or more of the number of said objects in said cohort and the number of properties for the objects in said cohort; and
    determine whether said current cohort should be further modified using one or more of additional reductions and additional expansions.

2. The apparatus of claim 1, wherein said initial cohort seeding is obtained from one or more of a user query, system analytics and a previously generated cohort.

3. The apparatus of claim 1, wherein said at least one hardware device is further configured to select a view by dragging and dropping said current cohort onto a visual representation for the selected view.

4. The apparatus of claim 1, wherein said at least one hardware device is further configured to process a visualization-driven query to gather data required for the selected view.

5. The apparatus of claim 1, wherein current cohort is reduced by interacting with a selected visualization to reduce a number of said data objects in said current cohort.

6. The apparatus of claim 5, wherein said interaction with said visualization for reducing said current cohort further comprises a direct visual selection of graphical elements that represent subsets of said current cohort and applying filters based on the visual selection.

7. The apparatus of claim 1, wherein said current cohort is expanded by dragging and dropping said current cohort onto a visual representation for a given analysis to initiate said step of expanding said current cohort using one or more selected analytics.

8. The apparatus of claim 1, wherein said current cohort is expanded by modifying said current cohort to produce a larger cohort by expanding one or more of the number of said objects in said cohort and the number of properties for the objects in said cohort.

9. The apparatus of claim 1, wherein said at least one hardware device is further configured to visualize said expanded current cohort using the current selected view.

10. The apparatus of claim 1, wherein said determination is based on one or more of a statistical measure and experience of a user.

* * * * *